Figure 1:
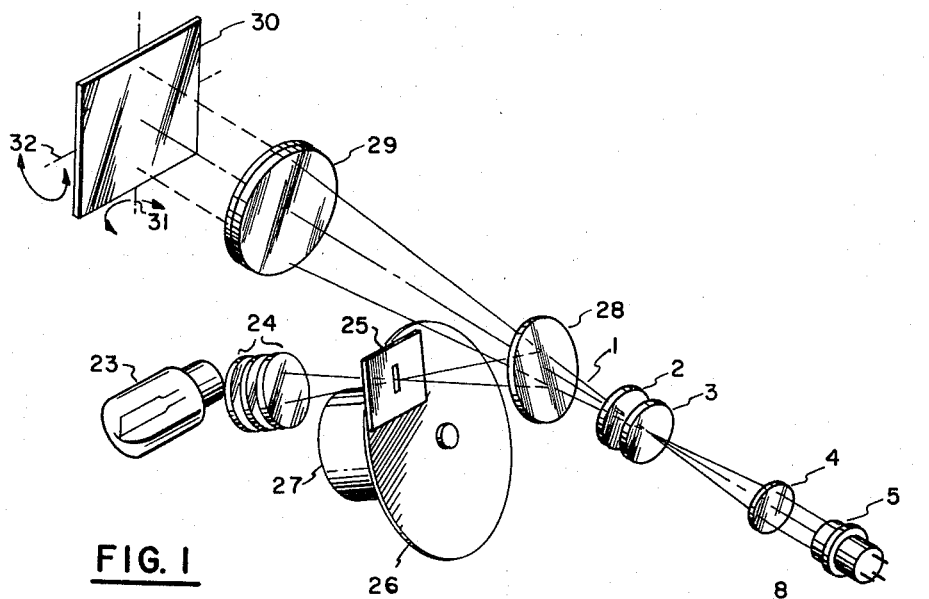

May 2, 1967 W. J. DALEY ET AL 3,316,799
TWO AXIS AUTOCOLLIMATOR USING POLARIZED LIGHT
Filed Nov. 7, 1962 2 Sheets-Sheet 1

INVENTORS
ROBERT W. ASTHEIMER
WILLIAM J. DALEY
BY Robert James Morton

ATTORNEY

INVENTORS
ROBERT W. ASTHEIMER
WILLIAM J. DALEY
BY
ATTORNEY

United States Patent Office 3,316,799
Patented May 2, 1967

3,316,799
TWO AXIS AUTOCOLLIMATOR USING POLARIZED LIGHT
William J. Daley, Ridgefield, and Robert W. Astheimer, Westport, Conn., assignors to Barnes Engineering Company, Stamford, Conn., a corporation of Delaware
Filed Nov. 7, 1962, Ser. No. 236,025
1 Claim. (Cl. 88—14)

This invention relates to an improved two axis photoelectric autocollimator.

Photoelectric autocollimators have achieved great success in the precision measurement of rotation of a distant reflecting surface about an axis. The most modern form of photoelectric autocollimator is one which uses chopped polarized light. Such a photoelectric autocollimator is described in the patent to Collyer 3,031,919, May 1, 1962. In this modification the autocollimator projects a beam of polarized light reflected from a beam splitter against the external reflecting surface and the reflected beam after passing through the beam splitter encounters a split field polarizing analyzer. This is followed by a suitable radiation detector, for example a photomultiplier tube. When initially calibrated for the position of no rotation the reflected beam passes through the dividing line of the split field analyzer and so equal amounts of energy encounter each side. In order to provide for A.C. electronic processing circuits the beam is chopped which is shown in the Collyer patent by a rotating plane polarizer in the initial beam. The chopper may also be located in the reflected beam. The only requirement is that the plane of polarization of the beam must be rotating when it strikes the analyzer. Other chopping means may be provided, for example, there is described in the patent to Daley No. 3,087,377, Apr. 30, 1963, a circular polarizing means to project a beam of circular polarized light with a rotating retardation plate in front of the split field analyzer.

For many uses a single axis autocollimator is all that is needed. However, a somewhat different problem has arisen involving rotation about two axes at right angles to each other. This is sometimes encountered when the mirror is on an element which can be flexed under certain conditions. If equipment is duplicated, that is to say two autocollimators are used or two analyzers and detectors with beam splitter, the problem is easily solved. One autocollimator measures rotation about one axis and the other about another. However, this involves considerable duplication of the elements and, therefore, leaves room for improvement. It is with an improved two axis autocollimator which does not use separate elements that the present invention deals.

Figure 2:
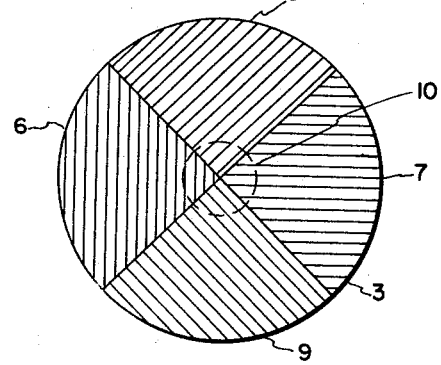
Figure 4:
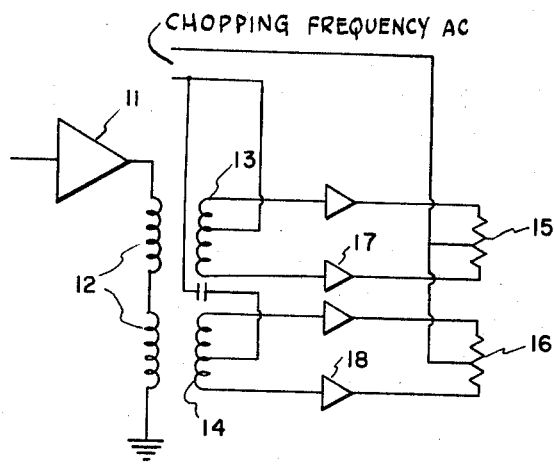
Figure 3:
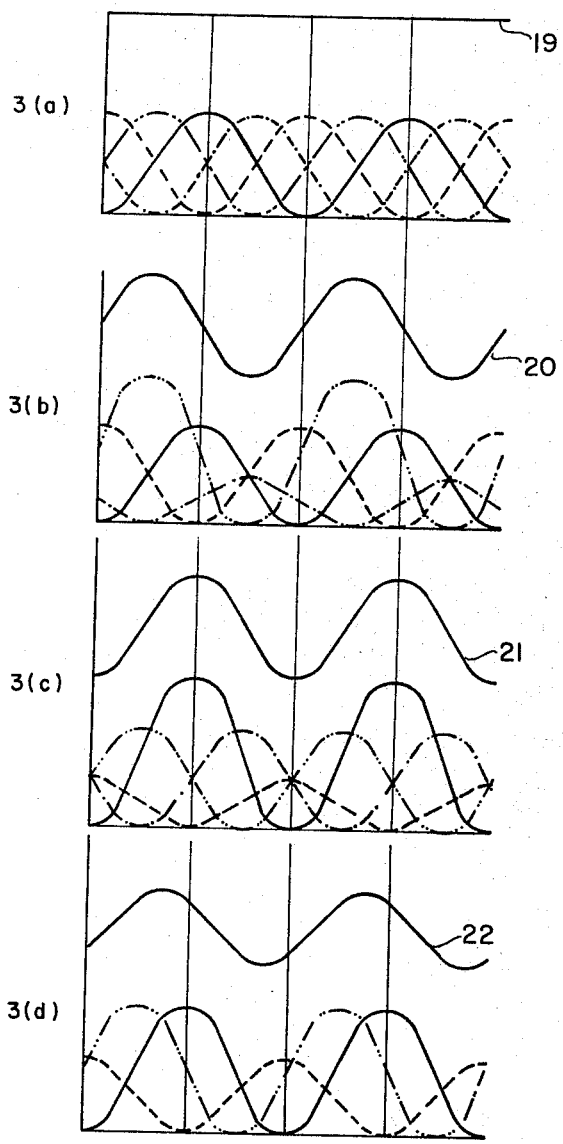
Figure 5:
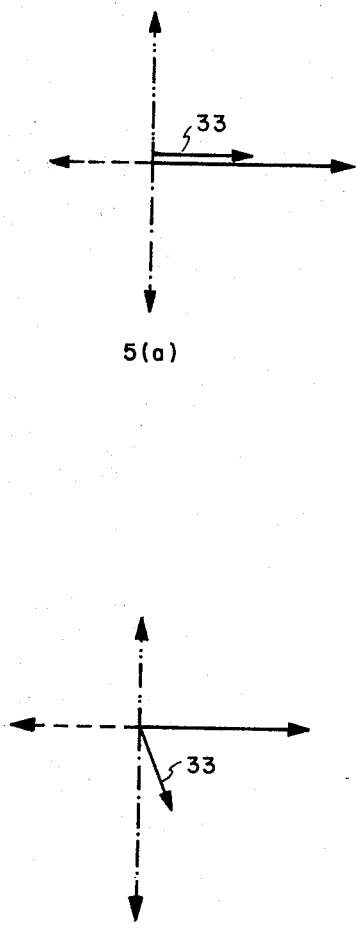

As with many instruments the present invention requires the combination of a new optical organization with modified electronic processing circuits and so can be considered as a combined electro-optical invention. The optical portion comprises a new type of polarized light analyzer which is capable of analyzing image translational movements in two directions at right angles to each other. The electrical portion comprises circuits which extract components due to rotation about either of the two axes from the composite signal produced by the photomultiplier tube or other radiation detector. The invention will be best understood and its advantages more clearly set out by a description of a typical instrument in connection with the drawings in which:

FIG. 1 is a diagrammatic isometric view of the rotating polarized reflecting beam autocollimator;
FIG. 2 is a plan view on a larger scale of the analyzer;
FIG. 3 is a series of curves showing the components and net output of the signal from the radiation detector;
FIG. 4 is a schematic diagram of one type of processing circuit, and
FIG. 5 is a series of two vector representations of the curves in FIGS. 3b and 3d.

FIG. 1 illustrates a typical autocollimator with a source of light 23, condensing lenses 24, a slit 25, and a rotating plane polarizer 26 which is turned by a motor 27. This produces a beam of plane polarized light the plane of which rotates continuously. The beam strikes a beam splitter 28 and is reflected out through collimating lenses 29 striking an external reflecting surface 30 which is to be monitored for rotation about either or both of two orthogonal axes 31 and 32. This portion of the autocollimator is not changed by the present invention but is shown to make the illustration complete.

The beam reflected from the reflecting surface 30 passes back through the collimating lenses 29 and beam splitter 28 forming a converging beam 1 which is the start of the improvements of the present invention. The beam 1 passes through an adjusting plate 2 and strikes a four quadrant analyzer 3 which will be described in greater detail in conjunction with FIG. 2. The positioning of the analyzer 3 is such that the lenses 29 image the collimated beam onto it. After passing through the analyzer the beam is imaged by a lens 4 onto a photomultiplier tube 5. It should be noted that the polarizer 26 produces a beam which goes through its cycle in 180°. In other words, there are two cycles per revolution of the beam and consequently the frequency of the signals from the photomultiplier tube are also double the frequency of rotation of the polarizer 26. This rotation results in chopping the radiation at the doubled frequency which will be referred to as the "chopping frequency."

FIG. 2 shows the analyzer 3 in greater detail. It is made up of four sectors, each polarizing light at 45° to the neighboring segment. This results in two opposite segments 6 and 7 with polarization at right angles to each other and two other segments 8 and 9 which also polarize at right angles to each other but which are displaced in their polarization by 45° with respect to segments 6 and 7. The image of the circular reflected beam is shown at 10 and is illustrated as being centered, that is to say, the condition where there is no rotation of the reflecting surface to be monitored about either of the two axes. The four output signal components from the photomultiplier tube 5 corresponding to the four quadrant sectors of the image 10 are shown in the curves of FIG. 3a. As these curves are of equal amplitude but in quadrature to each other there will be no net A.C. output as indicated by the fact that the net current output 19 is constant in time. If now the image of the reflected beam moves along either axis or a combination of the two a signal will be generated whose phase is indicative of the direction of such motion. The curves b and c show the effects of displacement along one axis and along the other and curve *d* shows the situation of a composite displacement which has components equally large along both axes. Curves *b*, *c* and *d* show resultant A.C. output as represented by the net output currents 20, 21 and 22. It will be seen that *b* and *c* represent changes in one phase or another and *d* contains components of both phases.

FIGS. 5*a* and *b* represent the curves in FIGS. 3*b* and 3*d* in the form of vectors. The various curves are represented by vectors having the same line structure as in the curves. This representation makes it somewhat easier to visualize the resultant signal when the image on the analyzer 3 is not centered. As the curves are 90° out of phase the vectorial representation is in the form of four vectors. FIG. 5*a* shows the same situation as in FIG. 3*b* namely where there is a movement of the image on the analyzer corresponding to rotation of the reflecting surface 30 about only one of the two axes. One of the vectors of the horizontal pair is, therefore, longer than the other and a net or resultant vector 33 is produced which is, of course, in the same direction as the stronger of the two signals. When there is displacement of the image on the analyzer as the result of rotations about both axes which is shown in FIG. 3*d*, there will be a difference of length of vectors in the case of each pair and the resultant 33 is, of course, in a different direction or rather in a different electrical phase as is shown in FIG. 5*b*.

The output of the photomultiplier tube is fed into electronic processing circuits one type of which is shown in FIG. 4. The output is amplified b ythe A.C. amplifier 11 producing an output introduced into a two winding transformer primary 12. This transformer has two split secondary windings 13 and 14 which are connected to an output 15 and 16 respectively through paired diodes 17 and 18. The secondaries are fed at a center tapped position with reference signals of the same frequency as the chopping and 90° out of phase with each other. This is indicated schematically in FIG. 4 by the connections going to the center taps of coils 13 and 14 and output loads 15 and 16. The reference signals may easily be produced by an alternating current line at chopping frequency, as shown in FIG. 4, one wire being connected directly and the other through a capacitor thus producing signals 90° out of phase. Since the production of reference signals and producing a 90° phase shift involve conventional circuits, the exact details of which form no part of the present invention, the latter has been illustrated on the drawing diagrammatically in block form. The production of such signals is conventional and so is not illustrated. The outputs 15 and 16 give signals corresponding to rotation about one or other of the two axes by the reflecting surface of the autocollimator the phase at each signal showing in which direction the rotation took place. As pointed out above when the beam is centered on the analyzer there will be no A.C. signal in either of the phase detectors formed of the coils 13 and 14 and output loads 15 and 16 respectively. On the other hand if there is displacement there will be a signal in the corresponding phase detector.

The detection by way of phased signal of rotation of the reflecting surface may be utilized in any desired manner. Thus, for example, if one is only concerned with indication of departure from centered position of a very small amount the signals may be read on instruments. If the departure from center position is too great or if higher accuracy is desired the instrument may be developed as a null instrument, the outputs from the two phase detectors operating through conventional servo mechanism devices which will turn the reflected beam back to centered position. If the instrument used is a null instrument, of course, there is no danger of the image of the reflected beam moving so far that it is all on one of two segments. The output signal is linear through a zero point but reaches a plateau when the image of the reflected beam is all the way over with respect to either axis. This plateau remains for a certain further movement and then the signal gradually falls off as still further movement results in vignetting. When a null instrument is used the problems of degree of rotation to be monitored do not enter or are much less severe. Of course, when the instrument is used as a null instrument if it is desired to obtain a measure of degree of rotation about either axis this must be taken off from the servo mechanisms, for example, by potentiometers turned by the servo mechanism. This form of readout is conventional for servo mechanisms and is, therefore, not shown.

Having described the present invention it can now be seen that as compared to the use of two autocollimators there is a great saving of elements. A single detector is used, a single analyzer, a single amplifier and the same number of phase sensitive detectors. Two autocollimators are physically separate devices. There are also duplicated elements producing the beams which are reflected. If the duplication is effected by beam splitting this makes it possible to use only one light source and polarizing means for producing rotating polarized light but the multiplication of detectors, amplifiers and other elements still remain. When the present invention is used there is obtained the same results with the elimination of a number of elements without eliminating their function. It should be noticed that this requires both the optical portion of the invention, that is to say, the four quadrant analyzer and the single optical radiation detector and electronic circuits which are capable of the proper phase detection. However, the number of electronic elements is not increased over what is needed if there are two separate autocollimators and in fact one amplifier can be dispensed with.

The saving in elements is only one advantage of the present invention albeit one of the most important ones. Another advantage is that when there is only a single analyzer and a single detector for radiation a much more rugged and reliable instrument is obtained because if two autocollimators are used the alignment problems with respect to each other are quite formidable and the instrument can become out of adjustment if used under environments where it is subjected to considerable physical shock. In the present invention the analyzer and detector are mounted in rigid alignment which eliminates to a very large degree any possibilities of misalignment when used in a hostile environment.

We claim:

In a polarized light photoelectric autocollimator having a light source and means for projecting a beam of plane polarized light therefrom and receiving a reflected beam from a reflecting surface, rotations of which about predetermined orthogonal axes are to be monitored, the improvement which comprises, in optical alignment along an optical axis of the instrument, (a) an analyzer at the focus of the reflected beam,
(b) the analyzer comprising four quadrants of polarizing material, opposite pairs of quadrants polarizing at right angles to each other and adjacent quadrants polarizing at 45° to each other, the planes of polarization of one pair being parallel to one orthogonal axis with respect to the analyzer and the other to the other axis, means for rotating the plane of polarization of the projected beam at a predetermined frequency, said means being located between the source of light and the analyzer,
(c) a reference A.C. source having a frequency equal to twice the rotational frequency of the plane of polarized light, and 90° out of phase therewith,
(d) a single radiation detector capable of transforming the polarized light into electrical signals, alternating current electronic processing circuits receiving the output of the detector and including two phase detection circuits, one phase detection circuit directly connected to the reference A.C. source, and the other connected thereto through means for changing the phase of the reference source by 90°, A.C. output means from the two phase detection circuits responding to A.C. signals at the frequency of the reference signal source, whereby, when the beam image on the analyzer is centered, no net A.C. component is detected and displacement of the image resulting from rotation of the reflecting surface about the two orthogonal axes produces outputs from the phase detectors corresponding to the rotation about the respective axes.

References Cited by the Examiner

UNITED STATES PATENTS

| | | | |
|---|---|---|---|
| 2,651,771 | 9/1953 | Palmer | 88—65 X |
| 2,703,505 | 3/1955 | Senn | 88—14 |
| 2,952,779 | 9/1960 | Talley | 88—14 X |
| 3,031,919 | 5/1962 | Collyer | 88—14 |
| 3,087,377 | 4/1963 | Daley | 88—14 |

JEWELL H. PEDERSEN, *Primary Examiner.*

O. B. CHEW, T. L. HUDSON, *Assistant Examiners.*